United States Patent
Hofmann et al.

(10) Patent No.: US 6,823,693 B1
(45) Date of Patent: *Nov. 30, 2004

(54) ANODIC BONDING

(75) Inventors: James J. Hofmann, Boise, ID (US); Glenn W. Piper, Meridian, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 770 days.

(21) Appl. No.: 09/036,291

(22) Filed: Mar. 6, 1998

(51) Int. Cl.[7] ............................................. C03C 27/00
(52) U.S. Cl. .................. 65/59.4; 156/272.2; 156/273.1; 156/273.9; 156/274.4; 205/114; 205/124
(58) Field of Search ............... 65/36, 40, 59.1, 65/59.4; 313/336, 338, 346 R; 156/272.2, 273.1, 273.9, 274.4; 205/114, 124; 250/492.2

(56) References Cited

U.S. PATENT DOCUMENTS

| | | | |
|---|---|---|---|
| 4,631,728 A | * 12/1986 | Simons | 372/38 |
| 5,141,604 A | * 8/1992 | Ayers | 204/59 R |
| 5,357,421 A | * 10/1994 | Tautz | 364/133 |
| 5,368,673 A | * 11/1994 | Okuda et al. | 156/274.4 |
| 5,410,282 A | * 4/1995 | Larrick et al. | 330/149 |
| 5,717,287 A | * 2/1998 | Amrine et al. | 313/495 |
| 5,820,648 A | * 10/1998 | Akaike et al. | 65/36 |

* cited by examiner

*Primary Examiner*—Peter Chin
(74) *Attorney, Agent, or Firm*—Trop, Pruner & Hu, P.C.

(57) ABSTRACT

A controller is used with an anodic bonding system that has a charge flowpath for supplying charge to bond materials together. The controller includes a switch and a circuit. The switch is configured to control a flow of the charge through the charge flowpath. The circuit is configured to monitor a rate of the flow, use the rate to determine an amount of the charge supplied for bonding, and based on the amount or rate, operate the switch to control the flow.

13 Claims, 13 Drawing Sheets

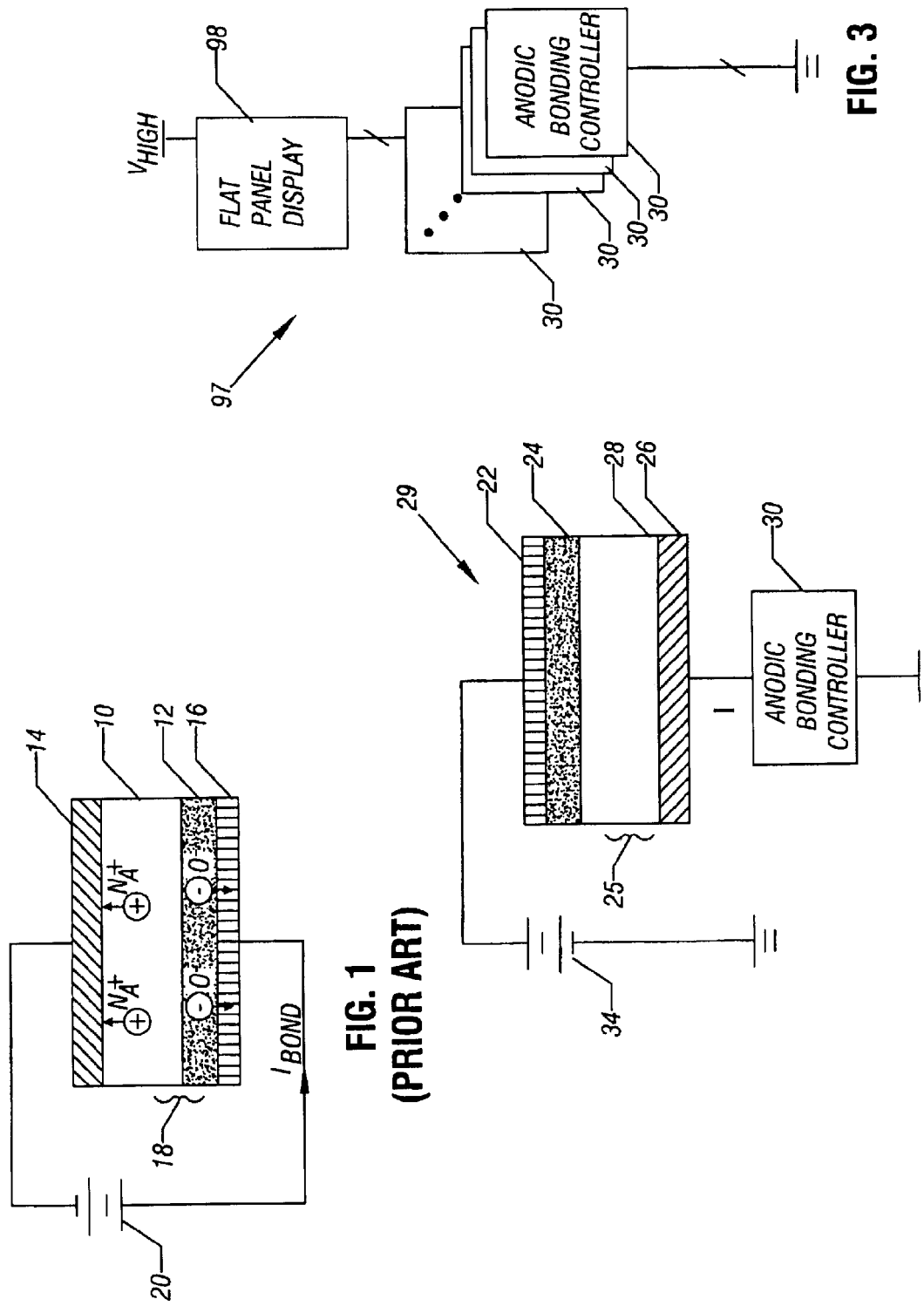

ANODIC BONDING

BACKGROUND INFORMATION

The invention relates to anodic bonding.

One way a glass material may be bonded to an oxidizable material (e.g., a metal, such as silicon) or another glass material is through a process called anodic bonding. During anodic bonding, heat is applied to the materials to be bonded, and oxygen ions in the heated glass material are drawn across a junction (where the two materials contact each other) to form a chemically bonded oxide bridge between the two materials. To draw the oxygen ions across the junction, an electric field typically is applied to the materials to create a flow of charge through the materials. The materials are heated until the alkali and alkaline earth ions become mobile allowing non-bridging oxygen ions to also diffuse. In this manner, negatively charged oxygen ions flow in one direction across the junction, and positively charged ions (e.g., alkali ions, such as sodium and lithium) flow in the opposite direction across the junction.

Referring to FIG. 1, as an example, anodic bonding might be used to bond a glass substrate 10 to a metal, such as silicon 12. To accomplish this, an electrode 14 is placed on the glass substrate 10 and biased (via a DC source 20) at a negative potential relative to the potential of another electrode 16 that is placed on the silicon 12. If the film of silicon is electrically conductive, electrical contact may be made directly to the film. In this manner, the two electrodes 14 and 16 establish an electric field across the glass substrate 10 and the silicon 12.

This electric field causes the positive ions (e.g., sodium ions) of the substrate 10 to move toward the negative electrode 14 and oxygen ions of the substrate 10 to move toward the positive potential (e.g., either toward the positive electrode 16 or the film of silicon, if conductive). As a result, the oxygen ions diffuse across a junction 18 (where the two materials contact each other) into the silicon 12 and react as follows:

$$2O^- + Si \Rightarrow SiO_2 + 2e^-$$

Thus, the oxygen ions react with the silicon to form silica ($SiO_2$), a stable oxide, which bonds the glass substrate 10 and the silicon 12 together. The amount of silica that is formed depends on the amount of charge that is supplied by the source 20.

Therefore, the rate at which the silica is formed depends on how fast charge is supplied by the source 20, or stated differently, the rate at which the silica is formed is a function of the magnitude of a current (called $I_{BOND}$) that is provided by the source 20. Although the rate at which the anodic bond is formed depends on the magnitude of the $I_{BOND}$ current, the quality of the bond is also quite often a function of the $I_{BOND}$ current.

When the $I_{BOND}$ current has a large magnitude, the relatively slow flow rate of the glass substrate 10 causes the silica to be formed in a small area. Better bond quality is typically achieved when the $I_{BOND}$ current has a smaller magnitude which allows the silica to form over a much larger area.

Although a minimum amount of silica must be formed to ensure a good bond, too much silica formation may present difficulties. For example, the silicon 12 might be a thin layer that is formed on top of a substrate. As a result, forming too much silica may delaminate, or remove, the silicon layer from the substrate.

Although anodic bonding has traditionally been used to bond small materials (e.g., materials having no dimension greater than six inches) together, anodic bonding may be used to bond materials to a larger substrate. For example, anodic bonding might be used to attach glass spacer rods to oxidizable material of a face plate of a field emission display (FED). Because of the relatively large size (e.g., dimensions greater than 12 inches) of the face plate, temperature gradients cause the magnitudes of the $I_{BOND}$ currents to vary, depending on where the anodic bonding occurs on the face plate. As a result, even if the same potential is used to bond all sites on the face plate, the silica is formed at different rates among the different bond sites.

SUMMARY OF THE INVENTION

The invention is generally directed to anodically bonding two materials together by monitoring and controlling the amount of charge used to bond the materials.

The advantages of the invention may include one or more of the following. The amount of oxide used to bond the materials is precisely controlled, and this amount is not affected by temperature. Several pieces of one material can be bonded to another relatively large material at one time. The cost of manufacturing flat panel displays is reduced. The time required to manufacture flat panel displays is reduced. Better quality control is maintained over the anodic bonding.

Generally, in one aspect, the invention features a controller for use with an anodic bonding system that has a charge flowpath for supplying charge to bond materials together. The controller includes a switch and a circuit. The switch is configured to control a flow of the charge through the charge flowpath. The circuit is configured to monitor a rate of the flow, use the rate to determine an amount of the charge supplied for bonding, and based on the amount, operate the switch to control the flow.

Generally, in another aspect, the invention features a system for bonding two materials together at a junction between the materials. The system includes an energy source, electrodes in contact with the materials, and a controller. The controller is configured to connect the energy source to the electrodes to transfer charge from the energy source to the junction, and disconnect the energy source from the electrodes after a predetermined amount of the charge has been transferred to the materials.

Generally, in another aspect, the invention features a system for bonding a number of first materials to a second material near different regions of the second material. The system includes an energy source and electrodes that are configured to establish charge flowpaths. The system also has controllers. Each different controller is associated with a different one of the flowpaths and is configured to cause charge to flow from the energy source through the associated flowpath until a predetermined amount of the charge flows through the associated flowpath.

Generally, in another aspect, the invention features a system for bonding glass spacer rods to a face plate of a flat panel display. The system includes an energy source, electrodes and controllers. The electrodes are configured to establish charge flowpaths. Each different flowpath is associated with a junction located between a different one of the glass spacer rods and the face plate. Each different controller is associated with a different one of the flowpaths and is configured to allow charge to flow from the energy source through the associated flowpath until a predetermined amount of the charge flows to the junction associated with the flowpath.

Generally, in another aspect, the invention features a method for anodically bonding two materials together. The method includes placing the two materials in contact with each other to form a junction between the materials. A current is applied through the materials to transfer charge to the junction. This current is monitored to determine the amount of the charge being transferred to the junction. The current is controlled based on the amount.

Generally, in another aspect, the invention features a method for bonding a number of first materials to a second material at different regions of the second material. The method includes placing each of the first materials in contact with the second material to form junctions between the first and second materials. Currents are applied through the first and second materials to transfer charge to the junctions. The amounts of charge transferred to each of the junctions are monitored, and based on the amounts, the currents are selectively controlled.

Generally, in another aspect, the invention features a method for anodically bonding slices of glass spacer rods to a face plate of a flat panel display. The face plate has a conductive layer for causing the emission of electrons from a base plate. The method includes placing the slices of glass spacer rods in contact with the face plate to create junctions between the slices of glass spacer rods and the face plate. An electrode is place in contact with each group of glass spacer rods to form a charge flowpath between each electrode and the conductive layer. A potential is applied between the electrodes and the conductive layer to cause charge to flow through the charge flowpaths. For each charge flowpath, an amount of charge flowing through the charge flowpath is monitored. The flow of charge through the flowpaths is selectively controlled based on the monitored amounts.

Generally, the invention features a method for bonding glass spacer rods to a face plate of a flat panel display. The method includes connecting electrodes to the face plate and glass spacer rods to establish charge flowpaths. Each different flowpath is associated with a junction located between a different one of the glass spacer rods and the face plate. An energy source is connected to the electrodes. For each flowpath, charge is allowed to flow from the energy source through the flowpath until a predetermined amount of the charge flows into the junction associated with the flowpath.

In implementations of the invention, the circuit may be configured to halt the flow of charge through the flowpath when the amount exceeds a predetermined threshold. The circuit may also be configured to operate the switch to halt the flow when the rate exceeds a predetermined level, and the circuit may also be configured to operate the switch to allow the flow to resume after a predetermined duration expires after the circuit halts the flow.

The circuit may include a timer that is configured to measure the predetermined duration. The circuit may include an integrator that is configured to determine the amount of charge supplied to the materials based on the integration of the rate over time. The circuit may include a comparator that is connected to the integrator and is configured to indicate when the amount of charge exceeds the predetermined threshold.

The materials may include an oxidizable material, such as an oxidizable material that is located on a face plate of a flat panel display. The materials may also include glass spacer rods of a flat panel display.

Other advantages and features will become apparent from the following description and from the claims.

BRIEF DESCRIPTION OF THE DRAWING

FIG. 1 is a cross-sectional view of an assembly to anodically bond a glass substrate to a oxidizable material.

FIG. 2 is a schematic diagram of an anodic bonding system.

FIG. 3 is a schematic diagram illustrating an anodic bonding system used in the manufacture of a flat panel display.

DESCRIPTION OF THE PREFERRED EMBODIMENTS

Figure 4:
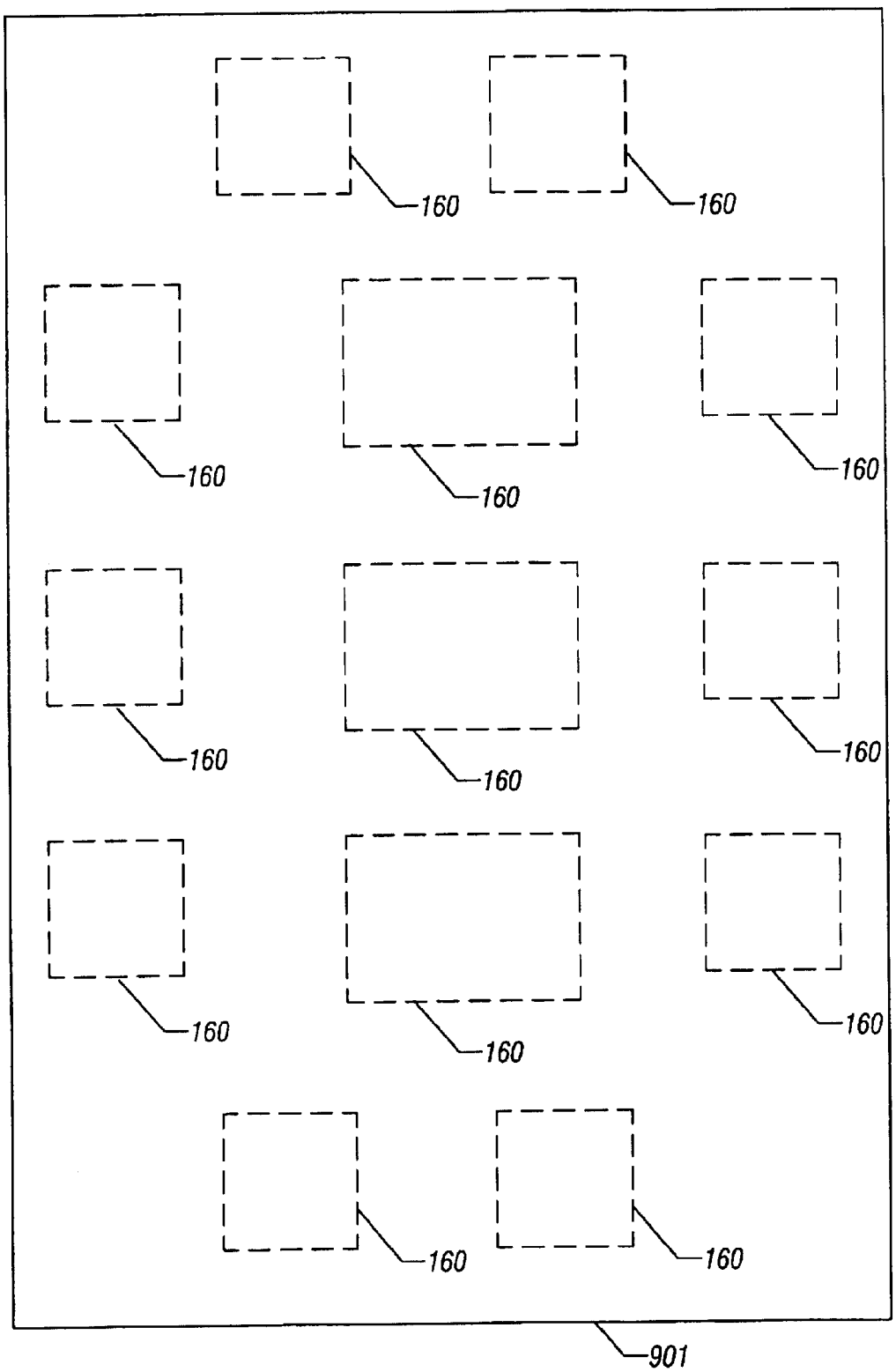
FIG. 4 is a schematic diagram of temperature zones of the system of FIG. 3.

Referring to FIG. 2, an anodic bonding system 29 has an anodic bonding controller 30 that is constructed to control how much charge is used to form an anodic bond between an oxidizable material 24 (e.g., a metal, such as silicon, or a thin film metal coated substrate) and a glass substrate 26. In this manner, the amount of bridging oxide (e.g., silica) formed at the bond site is precisely controlled.

The charge used to form the bond is supplied by a DC source 34 which supplies a bonding current (called $I_{BOND}$). The DC source 34 has a low enough voltage potential to ensure that, if no fault conditions exist (described below), the magnitude of the $I_{BOND}$ current remains small enough to permit proper flow of the glass substrate to achieve good bond quality.

For purposes of controlling the amount of charge supplied for the anodic bonding, the controller 30 is connected to control the existence of the $I_{BOND}$ current. To accomplish this, the controller 30 utilizes its serial connection with the DC source 34, an anodic electrode 22 and a cathodic electrode 26. The anodic electrode 22 contacts the material 24 and is connected to the positive terminal of the source 34. If the material 24 is electrically conductive, the anodic electrode 22 may be eliminated, and the positive terminal of the source 34 may be directly electrically connected to the material 24. The cathodic electrode 22 contacts the material 28 and is connected to the negative terminal of the source 34. The materials 24 and 28 contact each other at a junction 25.

Thus, when the controller 30 completes the serial loop, an electric field is established across the materials 24 and 28. This electric field establishes the $I_{BOND}$ current (i.e., induces charge to flow) across the junction 25, and as a result, an oxide bridge (e.g., a silica bridge) is formed between the two materials 24 and 28.

The controller 30 monitors the oxide formation by monitoring the amount of charge that is supplied for the oxide reaction. To accomplish this, the controller 30 is constructed to integrate the $I_{BOND}$ current, i.e., integrate the rate of charge flow. In this manner, the controller 30 precisely monitors the amount of charge being delivered, and as a result, the total amount of oxide formed at the bond site is independent of temperature or any other conditions that might affect the rate at which the oxide is formed.

The controller 30 is also constructed to monitor the magnitude of the $I_{BOND}$ current to detect a fault condition caused by arcing. Arcing occurs when a pore extends entirely through the glass substrate, and as result, only air exists between the two electrodes 22 and 26. Because the potential difference between the two electrodes 22 and 26 is sufficient to break down air, the presence of the pore causes an arc between the electrodes 22 and 26.

When an arc occurs, the glass substrate turns into a molten state which causes the pore to disappear, but this molten state is self-sustaining and can destroy the materials 24 and 28. However, once the controller 30 detects an arc, the controller 30 is constructed to temporarily turn off the $I_{BOND}$ current for a predetermined duration (e.g., 5 ms) of time to allow the glass substrate to "re-freeze" and thus, eliminate the molten state.

Referring to FIG. 3, because the amount of oxide formed at the bond site is independent of conditions that may otherwise affect the rate of oxide formation, in an anodic bonding system 97, several of the controllers 30 are used to anodically bond glass spacer rods to a face plate 902 of a flat panel display 98. As is typical, the face plate 902 (see FIG. 16) is the part of the flat panel display that has phosphors (e.g., red, green and blue phosphors) that are selectively bombarded by electrons to form an image on a front side of the face plate 902. The spacer rods are bonded on a rear side of the face plate 902 and provide structural support to separate the face plate 902 from an electron emitting base plate assembly (not shown). The spacer rods are generally spread out over the entire face plate 902.

Although the temperature varies across the face plate 902, each different controller 30 controls the anodic bonding in a different temperature zone 160 (see FIG. 4) of the face plate 902. Each temperature zone 160 is essentially a region that is small enough to have insubstantial, if any, spatial temperature variations. As a result, the spacer rods are anodically bonded to the relatively large face panel in parallel while precise control is maintained over the amount of oxide formed at each of the bond sites.

Figure 14:
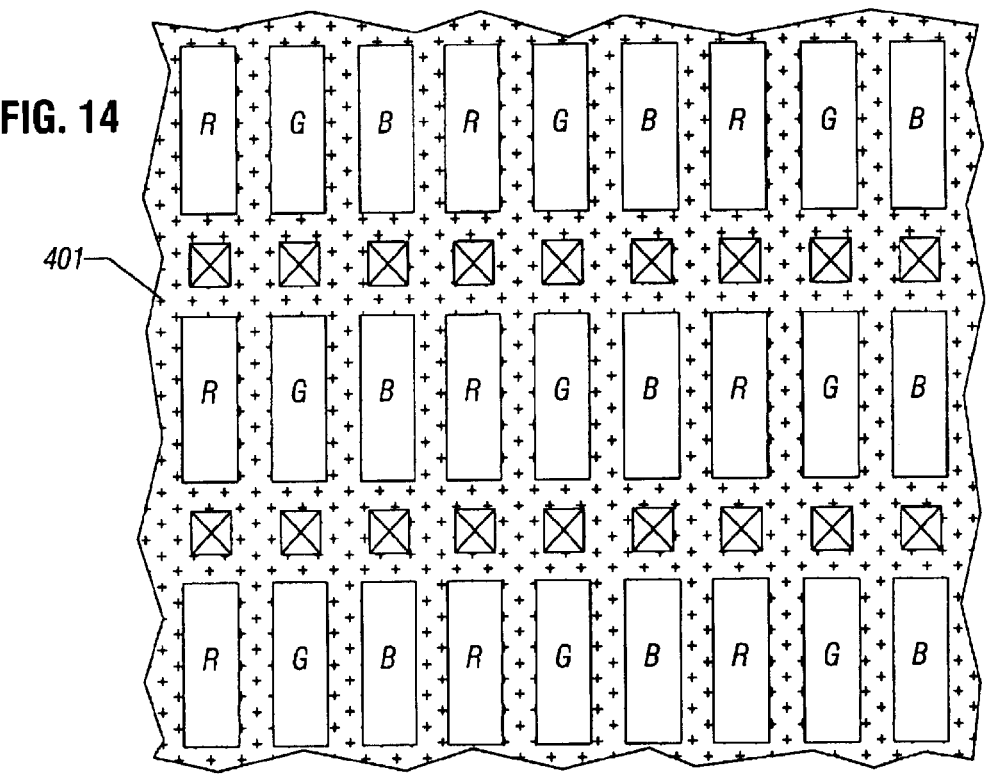
FIG. 14 is a top plan view of a "black" matrix pattern for one type of color display.
Figure 15:
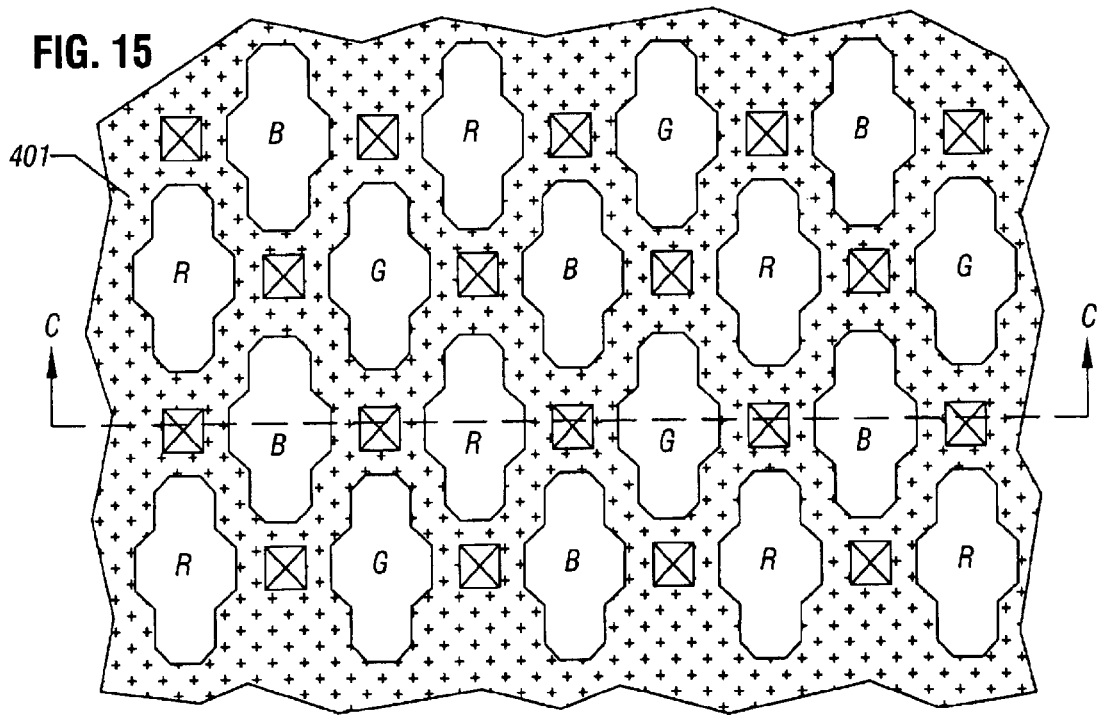
FIG. 15 is a top plan view of a "black" matrix pattern for a another type of color display.

A conductive layer 401 (see FIGS. 14 and 15) of the face plate 901, described below, serves as a common anodic electrode that is used in all of the temperature zones 160. One or more cathodic foil electrodes 903 are used in each temperature zone 160, and the electrodes 903 of each temperature zone 160 are connected to a different one of the controllers 30. Thus, for each different temperature zone 160, a different controller 30 is connected in series with the conductive layer 401 and a different one of the electrodes 903.

Figure 16:
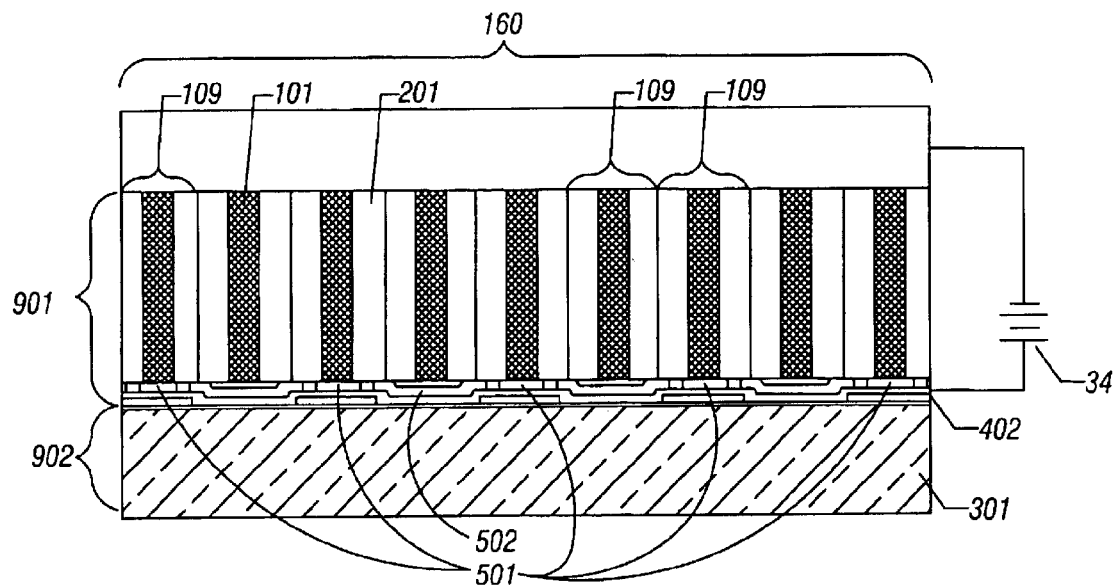
FIG. 16 is a cross-sectional view of the processed substrate of FIG. 12 following the placement of a hexagonally-packed slice thereon.

Referring to FIG. 16, for each temperature zone 160, the electrode(s) 903 contact a slice 901 (i.e., an array, described below) of glass spacer rods 109. Each rod 109 has a core 101 that is surrounded by a glass cladding 201 and the core 101 is anodically bonded to an oxidizable material 501 of the face plate 902.

Figure 5:
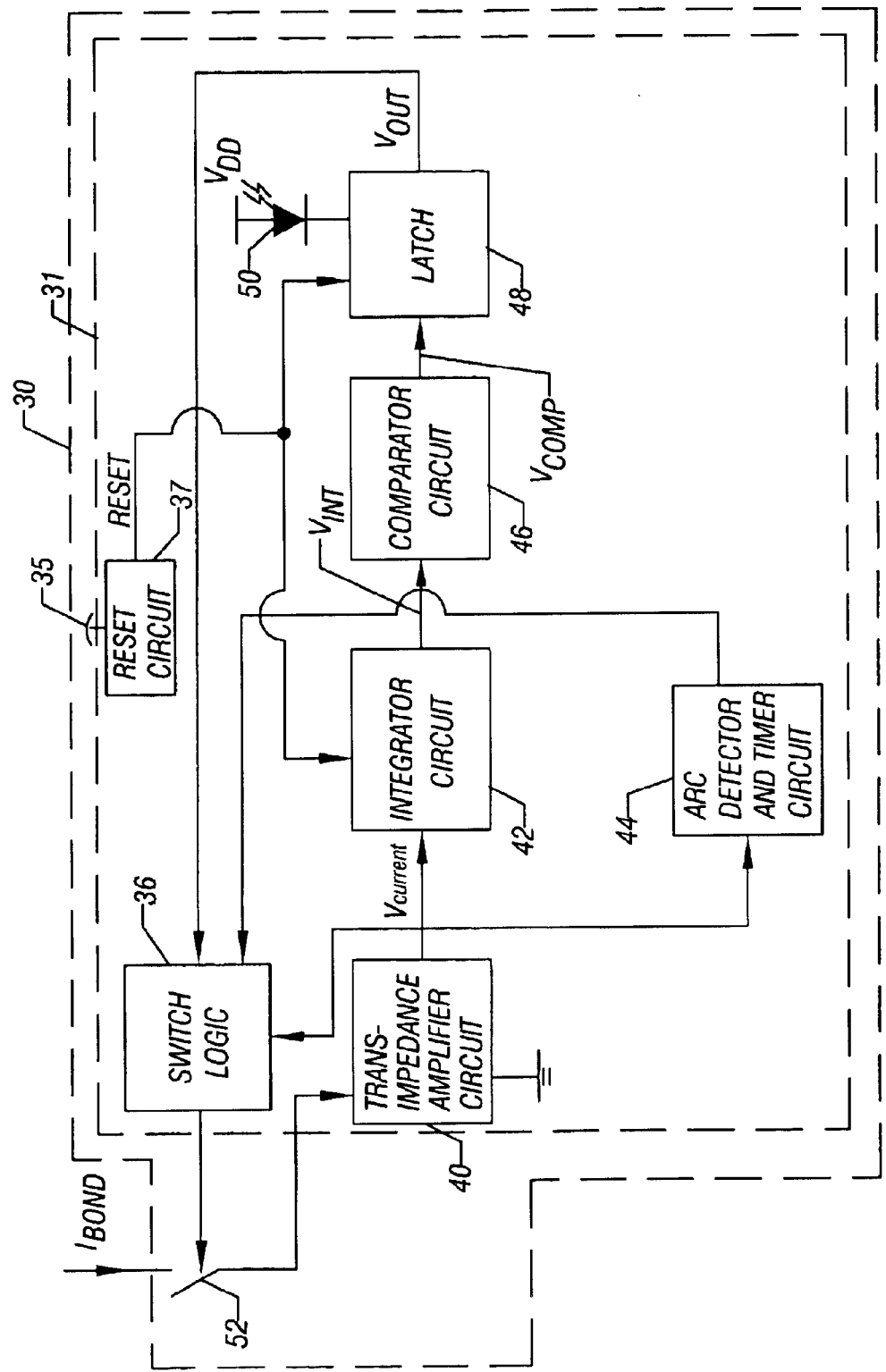
FIG. 5 is a block diagram of the anodic bonding controller of FIG. 2.

Referring to FIG. 5, the controller 30 has a control circuit 31 which is constructed to operate a switch 52 (an analog switch such as a transistor, for example) to turn on and off the $I_{BOND}$ current, i.e., turn on and off the flow of charge that is used to form the bridging oxide. In this manner, the switch 52 is located in series with the source 34 and the electrodes 22 and 26.

For purposes of monitoring the amount of charge that is supplied to the materials 24 and 28, the control circuit 31 makes use of the observation that the magnitude of the current $I_{BOND}$ represents a rate at which charge is flowing. In this manner, the total amount of charge that has been supplied for bonding is determined by an integrator circuit 42 that integrates this rate. To accomplish this, the integrator circuit 42 receives an input voltage signal (called $V_{CURRENT}$) which has a magnitude that represents the magnitude of the $I_{BOND}$ current.

The integrator circuit 42 integrates the $V_{CURRENT}$ signal to generate an output voltage signal (called $V_{INT}$). The magnitude of the $V_{INT}$ signal represents the ongoing total amount of charge that has been furnished for bonding. A comparator circuit 46 of the control circuit 31 is constructed to receive the $V_{INT}$ signal and assert, or drive high, a digital output signal (called $V_{COMP}$) when a predetermined amount of charge has been furnished for bonding, i.e., when the magnitude of the $V_{COMP}$ signal exceeds a predetermined threshold level. When the $V_{COMP}$ signal is asserted, a latch circuit 48 drives a digital output signal (called $V_{OUT}$) high to indicate when the predetermined total amount of charge has been delivered.

The control circuit 31 has switch logic 36 that is constructed to operate the switch 52 in response to the $V_{OUT}$ signal. In this manner, when the latch circuit 48 drives the $V_{OUT}$ signal high, the switch logic 36 opens the switch 52. When the latch circuit 48 drives the $V_{OUT}$ signal low, the switch logic 36 closes the switch 52 unless arcing has been detected, as described below.

To detect arcing, the control circuit 31 has an arc detector and timer circuit 44. The circuit 44 monitors the magnitude of the $V_{CURRENT}$ signal, and when the magnitude of the $V_{CURRENT}$ signal rises suddenly, (thereby indicating an arc), the circuit 44 instructs the switch logic 36 to open the switch 52 to halt the flow of charge. After instructing the switch logic 36 to open the switch 52, the circuit 44 measures a predetermined duration of time (e.g., 5 ms) to allow the molten glass substrate to re-freeze. At the expiration of the duration, the circuit 44 instructs the switch logic 36 to close the switch 52 and resume formation of the oxide.

The switch circuit 36 also, via the $V_{CURRENT}$ signal, monitors the magnitude of the $I_{BOND}$ current to detect an overcurrent condition. In this manner, the switch circuit 36 is constructed to open the switch 52 when the magnitude of the $I_{BOND}$ current exceeds a predetermined threshold.

The control circuit 31 also has a transimpedance amplifier circuit 40. The amplifier circuit 40 furnishes the $V_{CURRENT}$ signal. The amplifier circuit 40 is coupled in series with the switch 52 and provides a path to ground for the $I_{BOND}$ current.

The reset circuit 37 is constructed to assert a signal (called RESET) when a reset push button switch 35 is pressed. The assertion of the RESET signal causes the latch circuit 48 to drive the $V_{OUT}$ signal low (thus, closing the switch 52) and clears the indication of the total amount of charge that is stored by the integrator circuit 42.

Figure 6A:
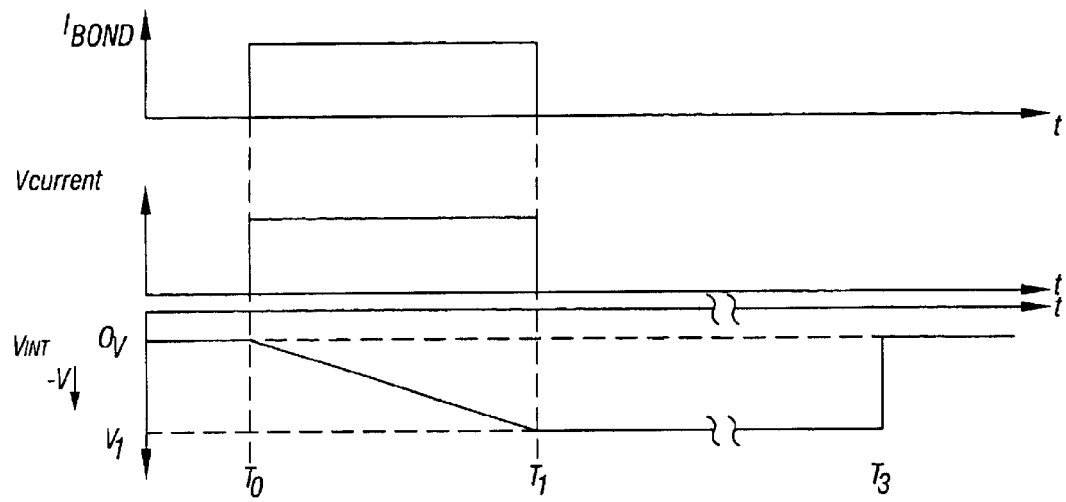
FIGS. 6A and 6B are waveforms of voltages and currents of the controller.

Referring to FIG. 6A, as an example of the normal operation of the controller 30, at time $T_0$, the controller 30 closes the switch 52 and allows charge to flow to start the formation of the oxide. As a result, the $I_{BOND}$ current and $V_{CURRENT}$ signal assume non-zero values and the $V_{INT}$ signal ramps downwardly (toward a predetermined voltage level called $V_1$) from ground. At time $T_1$, the magnitude of the $V_{INT}$ signal reaches the $V_1$ voltage level which indicates that the predetermined total amount of charge for bonding has been reached. Thus, at time $T_1$, the controller 30 opens the switch 52 and both the $I_{BOND}$ current and $V_{CURRENT}$ signal once again assume zero values. The $V_{INT}$ signal remains at the $V_1$ level until time $T_3$ when the reset push button 35 is pressed which causes the $V_{INT}$ signal to return to ground.

Figure 6B:
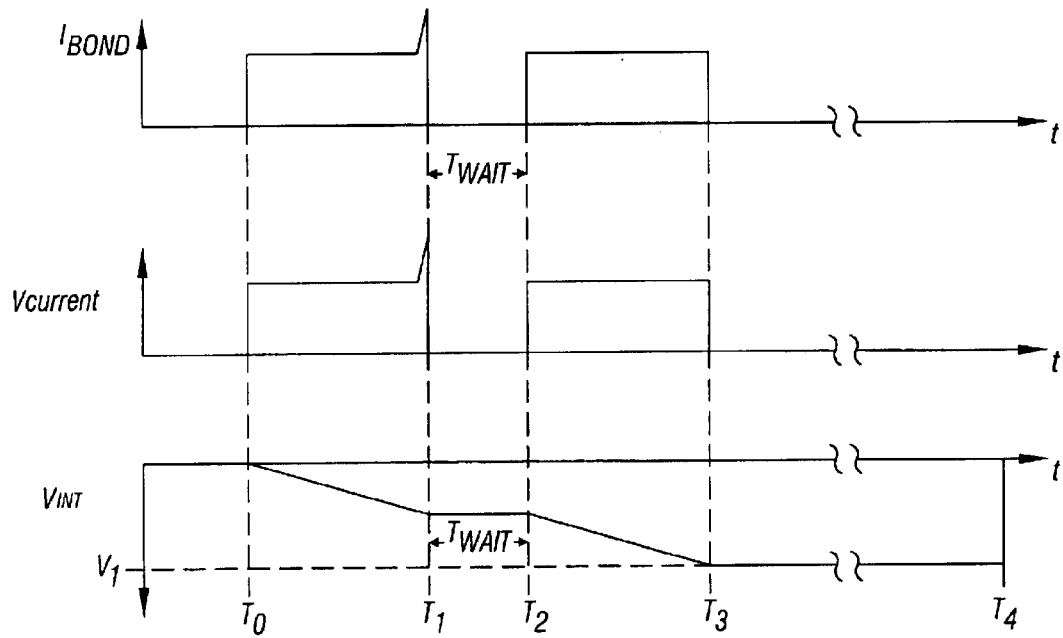

Referring to FIG. 6B, as an example of the operation of the controller 30 when arcing occurs, at time $T_0$, the switch logic 36 turns on and allows charge to flow to start the formation of the oxide. As a result, the $I_{BOND}$ current and $V_{CURRENT}$ signal assume substantially constant non-zero values, and the $V_{INT}$ signal linearly ramps downwardly from ground. However, slightly before time $T_1$, arcing occurs which causes the magnitude of the $I_{BOND}$ current to rise quickly, and the magnitude of the $V_{CURRENT}$ signal also rises quickly which indicates an arc. In response to the spike in the $I_{BOND}$ current, the controller 30 opens the switch 52 at time $T_1$. The controller 30 keeps the switch 52 open for a predetermined duration (called $T_{WAIT}$), such as 5 ms, until time $T_2$ when the controller 30 closes the switch 52. During the time interval from time $T_1$ to time $T_2$, the magnitude of the $V_{INT}$ signal remains the same.

At time $T_3$, the magnitude of the $V_{INT}$ signal reaches the $V_1$ threshold level which indicates the predetermined total amount of charge for bonding. Thus, at time $T_3$, the controller 30 opens the switch 52 and both the $I_{BOND}$ current and $V_{CURRENT}$ signal once again fall to ground. The $V_{INT}$ signal remains at the $V_1$ level until time $T_4$ when the reset button 35 is pressed which causes the $V_{INT}$ signal to driven to ground.

Figure 7:
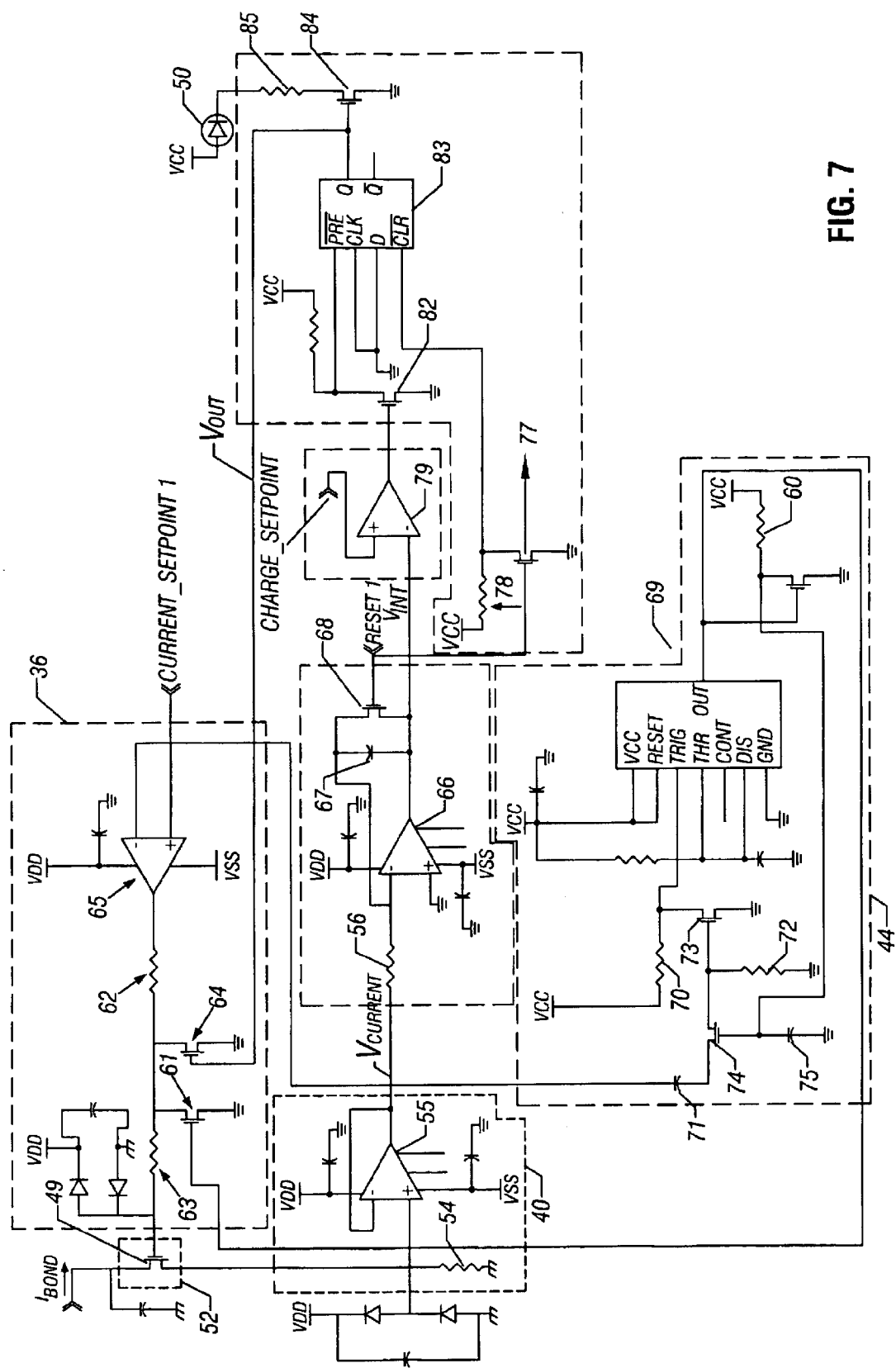
FIG. 7 is a more detailed schematic diagram of the controller.

Referring to FIG. 7, the switch 52 includes an insulated gate bipolar transistor (IGBT) 49. The drain-source path of the transistor 49 is connected in series with the source 34 and the electrodes 22 and 26. The gate of the transistor 49 is connected to the output of the switch logic 36.

The integrator circuit 42 includes an operational amplifier 66. The non-inverting input of the amplifier 66 is grounded, and an integrating capacitor 67 is coupled between the inverting input and output of the amplifier 66. The output of the amplifier 66 furnishes the $V_{INT}$ signal. The integrator 42 linearly scales the integration (i.e., sets the slope of the ramp output) based on an RC time constant formed from the capacitor 67 and a resistor 56. One end of the resistor 56 is connected to the inverting input of the amplifier 66, and the other end of the resistor 56 receives the $V_{CURRENT}$ signal.

For purposes of resetting the integrator circuit 42, an NMOS transistor 68 has its drain-source path coupled in parallel with the integrating capacitor 67. The gate of the transistor 68 receives the RESET signal. As a result, the capacitor 67 is discharged when the RESET signal is driven high.

The comparator circuit 46 includes a comparator 79. The inverting input of the comparator 79 receives the $V_{INT}$ signal. The non-inverting input of the comparator 79 is connected to an external voltage level (called CHARGE_SETPOINT1) which sets the minimum level of $V_{INT}$.

The latch 48 includes a D-type flip-flop 83 and an NMOS transistor 82. The output of the comparator circuit 46 drives the gate of the NMOS transistor 82. The drain of the transistor 82 drives the input of the flip-flop 83 and is coupled to a supply voltage level (called $V_{CC}$) through a resistor 81. The signal and clock inputs of the flip-flop 83 are connected to ground. The inverting preset input of the flip-flop 83 is connected to the output of the NMOS transistor 82.

To clear the output of the latch 48 when the RESET signal is driven high, the latch 48 includes an NMOS transistor 77. The drain of the transistor 77 is connected to the inverting reset input of the flip-flop 83, and the source of the transistor 77 is connected to ground. The drain of the transistor 77 is coupled to the $V_{CC}$ supply voltage level through a resistor 78. The gate of the transistor 77 receives the RESET signal.

The controller 30 includes a light emitting diode (LED) 50 that is turned on to indicate when the predetermined total amount of charge has been delivered. To drive the LED 50, the latch 48 includes an NMOS transistor 84. The drain of the transistor 84 is serially coupled to the LED 50 via a resistor 85. The source of the transistor 84 is grounded, and the gate of the transistor 84 is connected to the non-inverted output of the flip-flop 83.

The switch logic 36 includes two NMOS transistors 61 and 64 which control the switch 52. The switch logic 36 also includes an operational amplifier 65 which drives the switch 52. When the gates of either of the transistors 61 or 64 is driven high, the gate of the transistor 49 is pulled low which opens the switch 52. Otherwise, when the gates of both of the transistors 61 and 64 are low, the gate of the transistor 49 is controlled by the operational amplifier 65.

The transistor 64 controls the switch 52 based on the state of the $V_{OUT}$ signal. The transistor 61 controls the switch 52 based on whether an arc condition is detected by the arc detector and timer circuit 44. The operational amplifier 65 controls the switch 52 based on the comparison of the DC level of the $I_{BOND}$ current (represented by the $V_{CURRENT}$ signal) to an external DC voltage level (called CURRENT_SETPOINT1). The CURRENT_SETPOINT1 voltage level establishes a bond current setpoint. If the $I_{BOND}$ current rises above the bond current setpoint, the operational amplifier 65 lowers its output voltage to the switch 52, thus raising the resistance of the switch 52 and limiting the $I_{BOND}$ current.

The drain-source paths of the transistors 61 and 64 are connected in parallel. The sources of the transistors 61 and 64 are connected to ground. The drains of the transistors 61 and 64 are coupled to the operational amplifier 65 through a resistor 62 and are coupled to the gate of the transistor 49 through a resistor 63.

The arc detector and timer circuit 44 includes a timer 69 (e.g., a 555 timer) that is configured for monostable multivibrator operation. In this manner, when the trigger input of the timer 69 is momentarily pulsed low, the timer 69 generates a logic one pulse. The duration of the pulse governs the time in which the switch 52 is open after a detected arc.

To pulse the trigger input of the timer 69 low, the circuit 44 has an NMOS transistor 73 which is activated when a large spike occurs on the $V_{CURRENT}$ signal during an arc. To discriminate between the arc and other conditions, the circuit has a high pass filter through which the $V_{CURRENT}$ signal passes before reaching the gate of the transistor 73. In this manner, when an arc occurs, the gate of the transistor 73 is momentarily pulsed high which causes the transistor 73 to momentarily pulse the trigger input of the timer 69 low. In response, the timer 69 generates the pulse to drive the transistor 61 (of the switch circuit 36) to open the switch 52.

The high pass filter of the circuit 44 includes a capacitor 71 that has one terminal that receives the $V_{CURRENT}$ signal and one terminal that is connected to the gate of the transistor 73 through an NMOS transistor 74 that makes up part of a delay circuit. The high pass filter also includes a resistor 72 that is connected between the gate of the transistor 73 and ground.

When the timer 69 turns the switch 52 back on, the $I_{BOND}$ current spikes as the circuit comes on. To prevent this spike from triggering the arc detector and timing circuit 44, a delay circuit is used. The delay circuit includes two NMOS transistors 74 and 76 and a capacitor 75 and resistor 60 for timing.

When the output of the timer 69 goes high to turn off the switch 53, this transition of the output also turns on the transistor 76. In response, the transistor 76 discharges the capacitor 75 very quickly and thus, turns off the transistor 74. When the timer 69 goes back low, the transistor 76 turns off which permits the capacitor 75 to charge. Once the capacitor 75 has charged to a predetermined voltage level, the transistor 74 turns back on.

The time interval required for the capacitor 75 to charge is controlled by the resistor 60 that is connected to the $V_{CC}$ supply voltage level. This time interval is set long enough so that when the $I_{BOND}$ current spike caused by the switch 52 coming back on tries to trigger the timer 60, the transistor 74 is still off and thus, prevents triggering of the timer 60.

The transimpedance amplifier circuit 40 includes an operational amplifier 55 that has its non-inverting input connected to the source of the transistor 49 (of the switch 52). The output of the amplifier 55 provides the $V_{CURRENT}$ signal and is connected to the inverting input of the amplifier 55. A resistor 54 is connected between the source of the transistor 49 and ground.

The spacer rods 109 (see FIG. 16) are grouped into spacer slices that may have either a cylindrical or a square cross-section. For cylindrical spacer columns, a fiber strand bundle is prepared by hexagonally packing a large number of glass fiber strands of identical diameter into a bundle of preferably hexagonal cross section. With hexagonal packing, each fiber strand (except those at the peripheral surface of the bundle) is surrounded by six other fiber strands.

Figure 8:
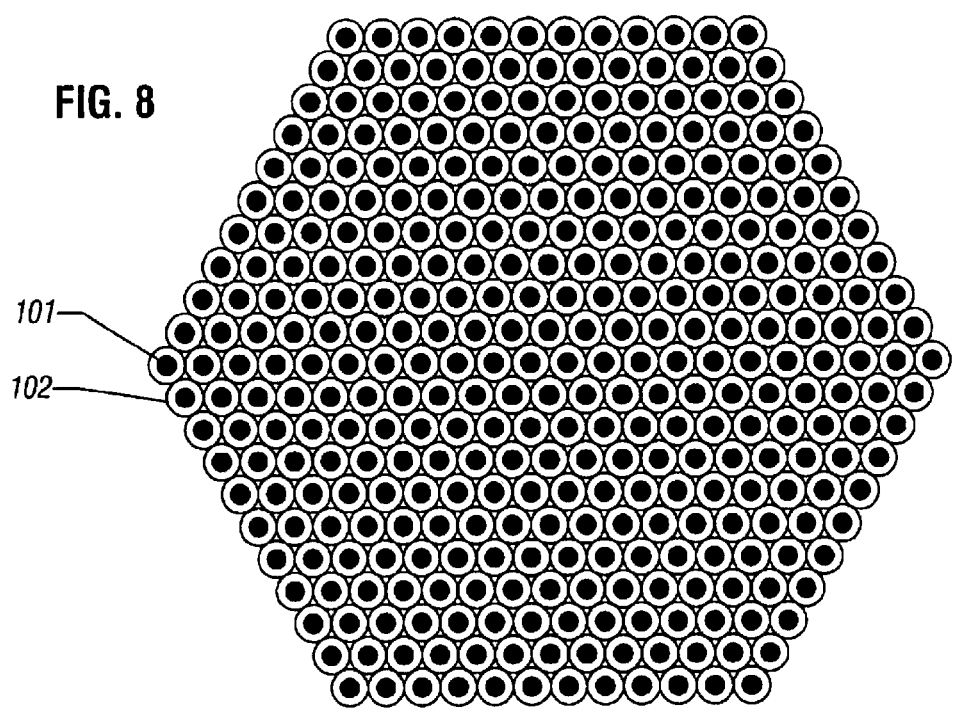
FIG. 8 is a cross-sectional view of a hexagonally-packed fiber-strand bundle.

Referring to FIG. 8, each cylindrical fiber strand has the glass fiber core 101 that is covered by a filler glass cladding 102. The cladding 102 can be etched selectively with respect to the permanent glass fiber core. Although the bundle depicted in FIG. 8 has an hexagonal cross section, other embodiments include surrounding a single permanent glass fiber with six filler glass fibers, and using the resulting seven-strand group as a repeating unit for the entire bundle.

For spacer columns having a square cross-section, the preferred embodiment fiber-strand bundles are produced by cubically packing permanent glass fiber strands within a matrix of filler glass fiber strands. With such an arrangement, both the permanent fiber strands and the filler fiber strands have identical square, cross-sectional dimensions.

Figure 9:
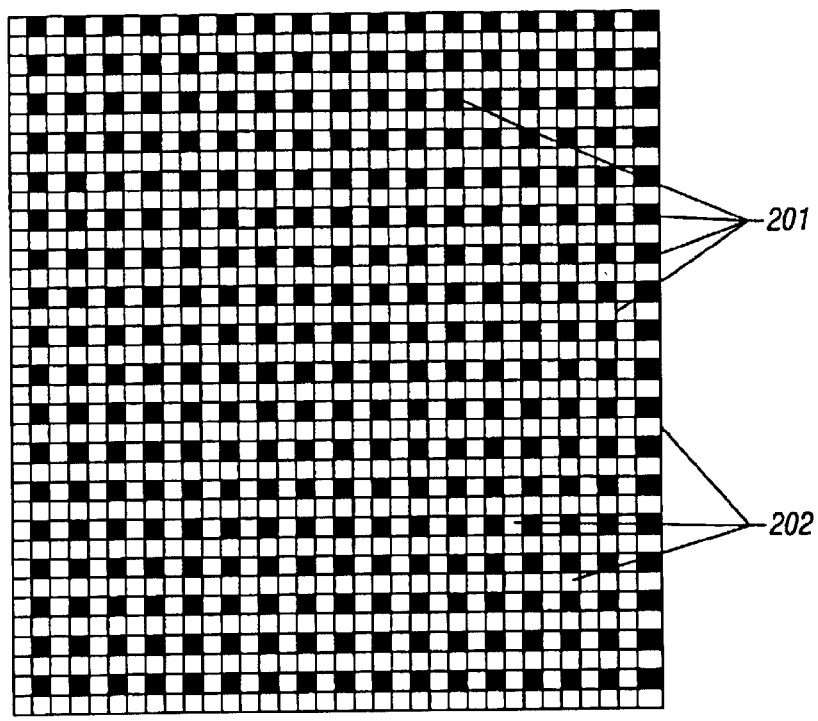
FIG. 9 is a cross-sectional view of a cubically-packed fiber-strand bundle.

FIG. 9 depicts a cross-sectional view through a cubically-packed fiber-strand bundle. Each permanent fiber strand 201 is imbedded within a sea of filler fiber strands 202. The ratio of permanent fiber strands 201 to filler fiber strands for the depicted matrix is 1:3. It is also possible to utilize fiber strands of rectangular cross section (not shown), which can be stacked one on top of the other or alternatingly overlapped as in a brick wall.

Although stacking one on top of the other can produce a bundle of perfect rectangular cross section, alternatingly overlapped stacking will produce a bundle of generally rectangular cross section. Two of the four sides will not be smooth, however, unless filled in by terminating strands at the surface which are half the size of the normal size strands.

The glass materials used for the spacer slices have coefficients of expansion which are similar to the coefficient of expansion for the laminar glass panel from which the face plate is constructed. Such a condition, of course, ensures that stress will be minimized during the anodic bonding process. Lead oxide silicate glasses, in some embodiments, are used for the permanent fiber strands, and have the following chemical composition: 35–45% PbO; 28–35% $SiO_2$; and a balance $K_2O$, $Li_2O$ and RbO.

In contrast to the permanent fiber strands, the composition of the filler strands includes a percentage of PbO that, in some embodiments, is greater than 50%. The difference in lead composition is primarily responsible for etch selectivity between the permanent fiber strands and the filler strands. In other embodiments, other combinations of glass formulations can be used that will provide both similar coefficients of expansion and selective etchability.

Once the fibers are tightly and accurately packed to form a bundle, the bundle is uniformly heated to a sintering temperature (i.e., the temperature at which all the constituent fibers fuse together along contact lines or contact surfaces). The bundle is then drawn at elevated temperature in a drawing tower, which uniformly reduces the diameter of all fibers, while maintaining a constant relative spacing arrangement between fibers. The bundle, after being drawn, may be cut into short intermediate lengths and redrawn. After the drawing the bundle one or more times, the final drawn bundle is cut into equal length rods.

After the final drawing, the permanent glass fibers within the drawn bundle have achieved the proper diameter or rectangular cross section for the intended display, with the spacing between permanent glass fibers corresponding to the spacing between anodic bonding attachment sites of the intended display.

The rods, all of which is virtually identical in shape, are then packed in a fixture to form a rectangular block. A single plane is perpendicular to and intersects the midpoint of each rod. As hexagonal rods will not pack perfectly to form a rectangular solid, partial filler rods may be used on the periphery of the rectangular block. The rectangular block is then heated to the sintering temperature in order to fuse all rods and partial filler rods into a rigid rectangular block. After cooling, the rigid block is sawed, perpendicular to the individual fibers, into uniformly thick rectangular laminar slices.

For a 1,500 volt, flat-panel, field-emission display, glass spacer rods approximately 380 microns in length (about 0.015 inch) are required to safely prevent shorting between the face plate and the base plate. Thus, slices somewhat greater than 400 microns in thickness are cut from the rigid block, and each slice is polished smooth on both major surfaces until the final thickness of each is 380 microns.

As certain temperature-related terms will be used hereinafter, a definition of each is in order. For a particular glass, the strain temperature (TS) is the temperature below which further cooling of the glass will not induce permanent stresses therein; the anneal temperature (TA) is the temperature at which all stresses are relieved in 15 minutes; and the transformation temperature (TG) is the temperature above which all silicon tetrahedra that make up the glass have freedom of rotational movement.

At the transformation temperature, most network modifier atoms are ionized and atoms such as sodium, lithium, and potassium are able to diffuse throughout the glass matrix with little resistance. For glass materials, the following relationship is true: TS<TA<TG.

A laminar silicate glass substrate (e.g., soda lime silicate glass), which will be transformed into the face plate of the display, is subjected to a thermal cycle in order to dimensionally stabilize it. During a thermal stabilization process, the substrate is heated from 20° C. (room temperature) to 540° C. over a period of about 3 hours. The substrate is maintained at 540° C. for about 0.5 hours. Then, over a period of about 1 hour, it is cooled to 500° C., and then down to 20° C. over a period of about 3 hours.

In some embodiments, TS is approximately 528° C.; TA is approximately 548° C.; and TG is approximately 551° C. It should be noted that chemical reactivity of the glass substrate is of no consequence, as only a thin silicon layer that will be subsequently deposited on the substrate is responsible for the anodic bonding reaction.

The cross-sectional drawings of FIGS. 10, 11, 12 and 18 depict the process employed to prepare the dimensionally stabilized laminar substrate 301 for both the anodic bonding process and for use as a display screen. The term "patterned," in the context of this description, is intended to inclusively refer to the multiple steps of depositing a photoactive layer, such as photoresist, on top of a structural layer, exposing and developing the photoactive layer to form a mask pattern on top of the structural layer and, finally, selectively removing portions of the structural layer which are exposed by the mask pattern by a material removal process such as wet chemical etching, reactive-ion etching, or reactive sputtering, in order to transfer the mask pattern to the etchable layer.

Figure 10:
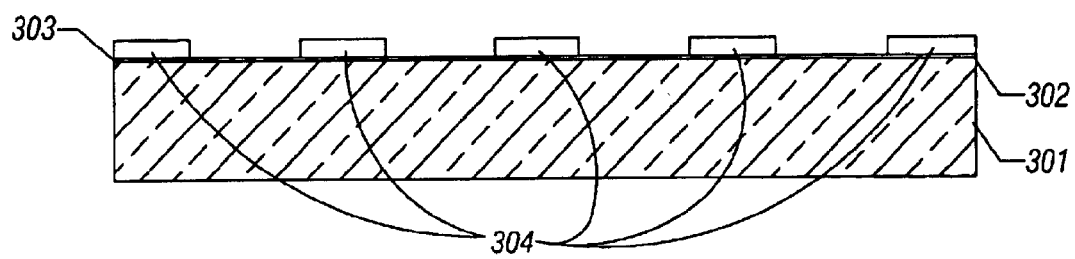
FIG. 10 is a cross-sectional view of a dimensionally stabilized substrate.

Referring to FIG. 10, in some embodiments, the dimensionally stabilized substrate 301 is coated with an anti-reflective layer 302 of a material, such as silicon nitride. The anti-reflective layer 302 has an optical thickness of about one-quarter the wavelength of light in the middle of the visible spectrum, or about 650 Å in the case of silicon nitride. The anti-reflective layer 302 reduces the reflectivity of a subsequently deposited opaque layer from near 80 percent to about 3 percent.

Following the deposition of the anti-reflective layer 302, an opaque, or nearly opaque, layer 303 is deposited to a thickness of about 1,000 to 2,000 Å on top of the anti-reflective layer 302. The opaque layer 303 may be a silicon metal, for example. The opaque layer 303 is then coated with photoresist resin that is exposed and developed to form a matrix pattern mask 304.

Figure 11:
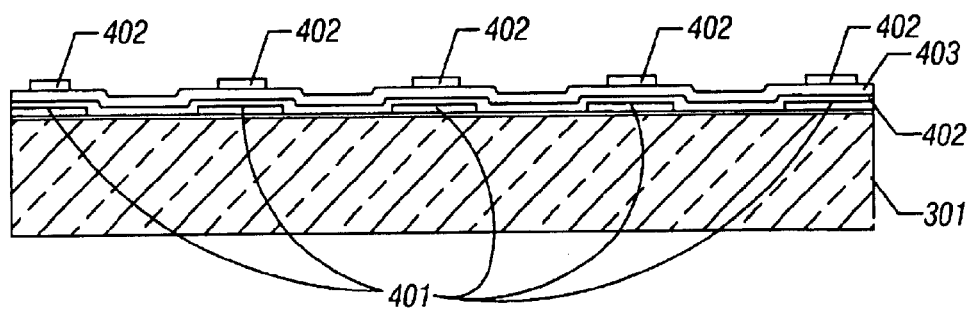
FIG. 11 is a cross-sectional view of the processed substrate of FIG. 10 following the etching of an opaque layer, deposition of a transparent, solid conductive layer, deposition of an oxidizable material layer, and masking of the latter layer.

Referring to FIG. 11, the opaque layer 303 is etched to form a "black" matrix 401, which surrounds transparent regions where the anti-reflective layer 302 is exposed. It is in these exposed regions that, for a colored display, luminescent red, green and blue phosphor dots will be deposited. The black matrix 401 has several functions. It will serve as a contrast mask for projected images during display operation. It is also etched with alignment marks, preferably near the outer edges of the glass substrate 301.

The phosphor dot printing or deposition process is aligned to these alignment marks, and these alignment marks are also used to optically align the phosphor dots on the screen to the corresponding field emitters on the base plate when the face plate and the base plate are assembled and the edges sealed. So that they will be undetectable to the viewer, the spacer columns will be attached in the regions covered by the black matrix 401.

In the figures, an "X" marks each preferred site for spacer column attachment. FIGS. 10–13 and 16–19 are cross-sectional views taken through line C—C of the black matrix pattern of FIG. 15.

Still referring to FIG. 11, the anti-reflective layer 302 and the black matrix 401 are covered with a 2,500 Å-thick conductive layer 402 of a transparent, solid, conductive material, such as indium tin oxide or tin oxide. During display operation, a voltage potential will be applied to the entire screen via the conductive layer 402. This applied voltage potential will cause electrons which are emitted from the field emitters (not yet identified) located on the base plate to accelerate until they collide with the phosphor dots deposited on the face plate.

An oxidizable material layer 403, having a thickness of about 3,200 Å, is then deposited via chemical vapor deposition or physical vapor deposition (i.e., sputtering) on top of the conductive layer 402. The oxidizable material layer 403, may be silicon, a metal which oxidizes under the conditions prevailing during the anodic bonding or many other oxidizable materials which are compatible with the both the manufacturing process and the specifications of the final product. The oxidizable material layer 403 is coated with photoresist resin that is exposed and developed to form an attachment site pattern mask 404.

Figure 12:
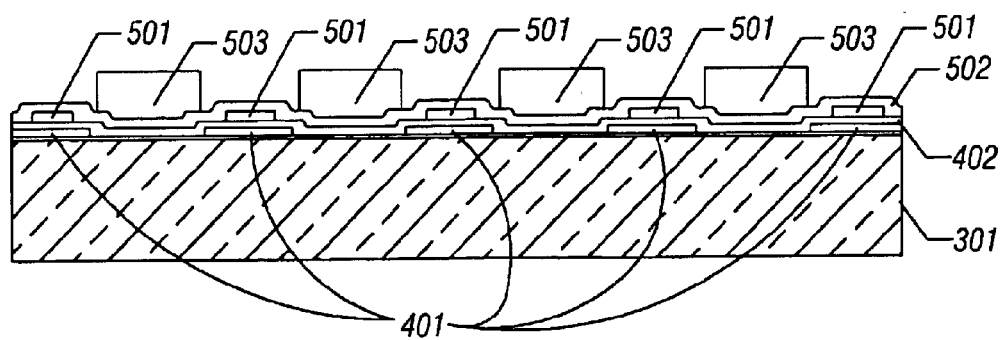
FIG. 12 is a cross-sectional view of the processed substrate of FIG. 11 following the etching of the oxidizable material layer, deposition of a protective sacrificial layer, and masking of the latter layer.

Referring to FIG. 12, an etch step has transferred the attachment site pattern of mask 404 to the underlying oxidizable material layer 403, leaving a square oxidizable material patch 501 about 35 microns on a side at each of the spacer column attachment sites on the glass substrate. Following this etch step, a protective sacrificial layer 502 of a material, such as cobalt metal, aluminum metal, chromium metal, molybdenum metal, or even cobalt oxide, is blanket deposited over the oxidizable material patches 501 and over the conductive layer 402.

The material from which the protective sacrificial layer 502 is formed must be selectively etchable with respect to the material from which the oxidizable material patches 501 are formed. This requirement still affords wide latitude in the choice of materials. The protective sacrificial layer 502 is then coated with photoresist resin that is exposed and developed to form an attachment site clearing pattern mask 503. The mask 503 is approximately a reverse image of the pattern of mask 404.

Figure 13:
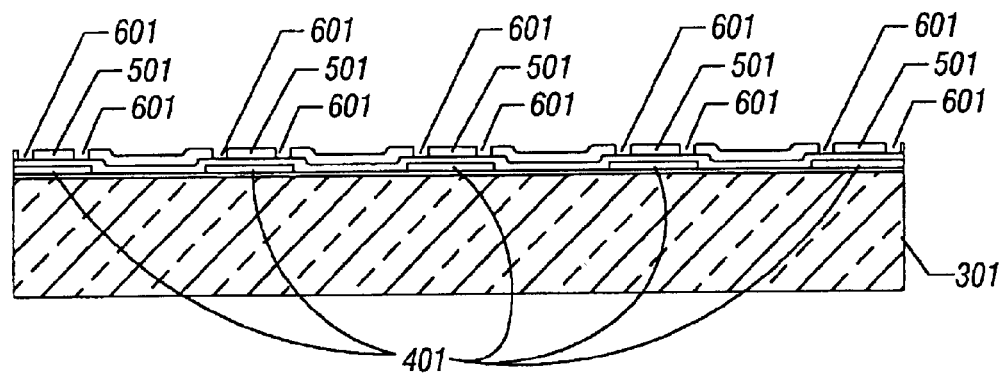
FIG. 13 is a cross-sectional view of the processed substrate of FIG. 12 following the etching of the protective sacrificial layer.

Referring to FIG. 13, the protective sacrificial layer 502 is etched to expose each oxidizable material patch 501 and leave about a five-micron-wide channel 601 around each oxidizable material patch 501, which exposes the transparent conductive layer 402 directly below. The remaining portion of the manufacture of the face plate assembly (depicted by FIGS. 16, 17, 18 and 19) is primarily concerned with anodic bonding of the spacer slice to the face plate.

Referring to FIG. 16, a polished, uniformly-thick spacer slice 901 is positioned on the prepared face plate 902, with the oxidizable material patches 501 and the protective layer 502 of the face plate 902 in contact with the spacer slice 901. For a large display, it is necessary to tile the spacer slices, as accuracy of permanent fiber spacing is difficult to maintain within a fiber bundle having a diameter greater than about 5 cm. A metal foil electrode 903 (e.g., aluminum) is spread on the major surface of the spacer slice 901 which is not in contact with the face plate 902. The foil electrode 903 functions as the cathode during the anodic bonding process.

Electrical contact is then made to the transparent, solid, conductive layer 402 by, for example, fastening a metal, spring clip to the protective layer on the face plate. Because of the presence of the transparent conductive layer 402 (which functions as the anode during the anodic bonding process, both the protective layer 502 (which covers future phosphor areas of the face plate) and the oxidizable material patches 501 (the spacer column attachment sites) are all electrically interconnected.

Figure 17:
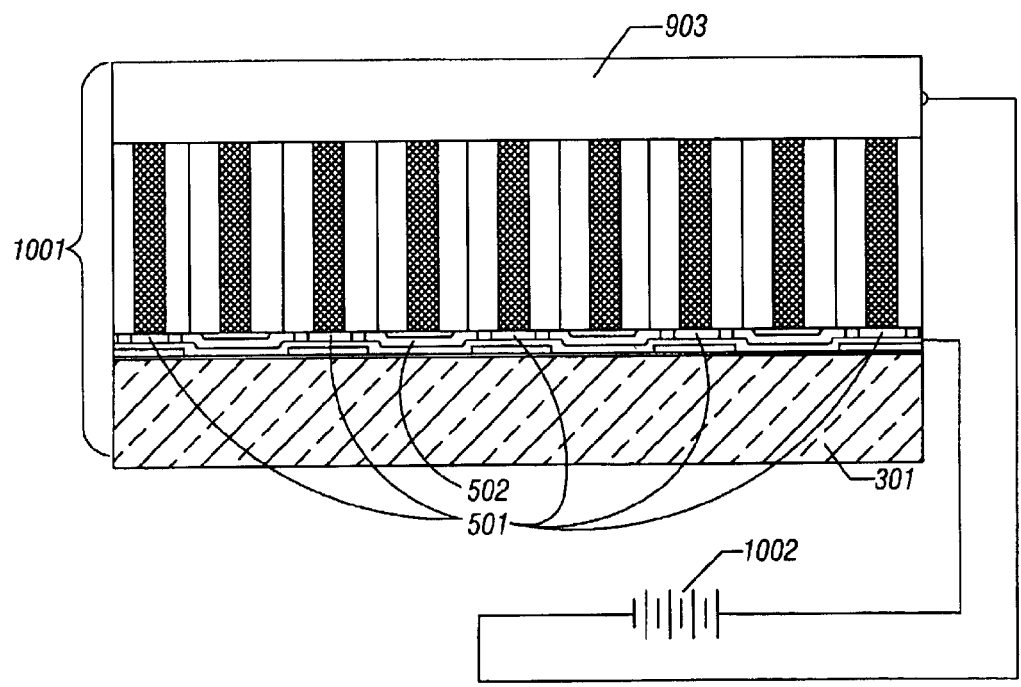
FIG. 17 is a cross-sectional view of the processed substrate/spacer slice assembly connected to a voltage source.

Referring to FIG. 17, the face plate/spacer slice assembly 1001 is placed in an oven (not shown). In the oven, the face plate/spacer slice assembly 1001 is heated to a temperature within a range of about 280° C. to 500° C. For the type of permanent glass fibers utilized in the spacer slice 901, as heretofore described, a possible temperature range might be from 450–475° C., plus or minus several degrees. A voltage within a range of about 300 to 1,000 volts, provided by voltage source 1002, is applied between the metal aluminum foil electrode 903 and the transparent conductive layer 402. The liberated, positively-charged, lithium and/or sodium ions are attracted to the negatively charged electrode (i.e., the aluminum foil cathode), leaving behind a negative fixed charge in the bulk of the spacer glass.

Some non-bridging oxygen atoms within both the permanent and filler glass columns of the spacer slice are also ionized. In their ionized state, they are strongly attracted to the positively-charged materials (i.e., the oxidizable material patches 501 and the protective layer 502) overlying the transparent, conductive layer. Where portions of the spacer slice 901 overlie an oxidizable material patch 501, these oxygen ions chemically react with the atoms with which they are in contact on the surface of the underlying oxidizable material patch 501 to form a silicon dioxide fusion layer 1003 (see FIG. 22), which fuses all permanent and filler glass columns to the underlying silicon patch.

Where glass columns of the spacer slice overlie the protective sacrificial layer 502 the oxygen ions from the glass columns chemically react with the atoms with which they are in contact on the surface of the underlying protective sacrificial layer 502. Although there is some flowing and creeping of the both permanent and filler glass material during the anodic bonding process, in regions where glass columns of the spacer slice overlie the micron-wide channel 601 surrounding each oxidizable material patch 501, anodic bonding is somewhat hampered. Effectiveness of the anodic bonding process is highly dependent on the flatness of the two surfaces (i.e., those of the spacer slice 901, and those of the prepared face plate 902) which are in intimate contact with one another.

In addition, the surfaces must be free of extraneous particles which would preclude contact over the entire surface. Upon contact, the two materials form a junction. Oxygen ions in the glass are drawn across the interface and form a chemically bonded oxide bridge between the glass columns in the spacer slice and whatever material overlies the transparent, conductive layer on the face plate.

Figure 18:
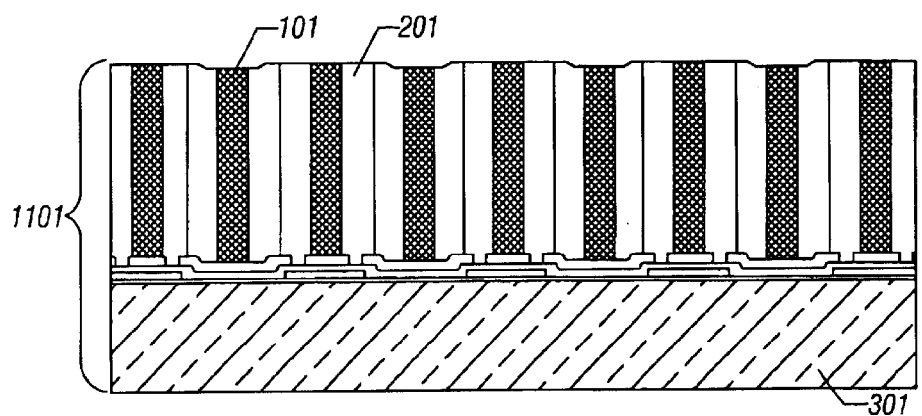
FIG. 18 is a cross-sectional view of the processed substrate/spacer slice assembly following anodic bonding of the wafer slice thereto.

FIG. 18 depicts the anodically bonded substrate/spacer slice assembly. It will be noted that during the anodic bonding process, the gaps that existed between the substrate and the spacer slice 901 as a result of uneven topography on the substrate have been filled in. This is likely caused both by the electrostatic force employed during the anodic bonding step which forced the slice against the substrate, and by the migration of silicon and oxygen atoms into the gaps.

Figure 19:
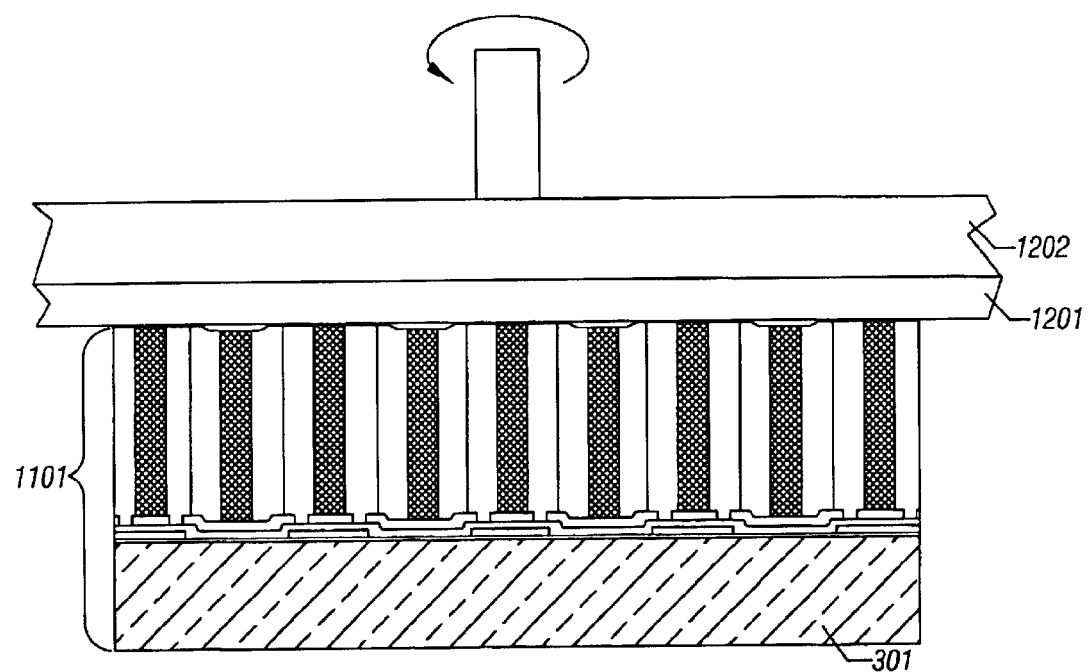
FIG. 19 is a cross-sectional view of the anodically-bonded substrate/spacer slice assembly of FIG. 18 during optional chemical-mechanical planarization.

Referring to FIG. 19, an optional polishing step is shown being performed on the anodically-bonded substrate/spacer slice assembly. Chemical-mechanical polishing is believed to be the preferred polishing technique. For the chemical-mechanical polishing operation, a circular polishing pad 1201 mounted on a rotating polishing wheel 1202 is wetted with a slurry (not shown) containing both an abrasive powder and a chemical etchant, and brought into controlled contact with the upper surface of the anodically bonded spacer slice 1101.

The chemical-mechanical polishing step is utilized to eliminate any significant deviations from planarity on the upper surface of the bonded spacer slice. A non-planar upper surface on the anodically bonded spacer slice 1203 might result in uneven spacer loading in the completed display with only a portion of the permanent glass spacer rods bearing the atmospheric load. Such a condition would likely increase the probability of spacer failure. It should be noted that if the bonded spacer slice 1203 is to be polished in this optional step, the unbonded spacer slice 901 must be made slightly thicker than the desired final thickness to accommodate removal of material during the post-anodic-bonding polishing step.

Figure 20:
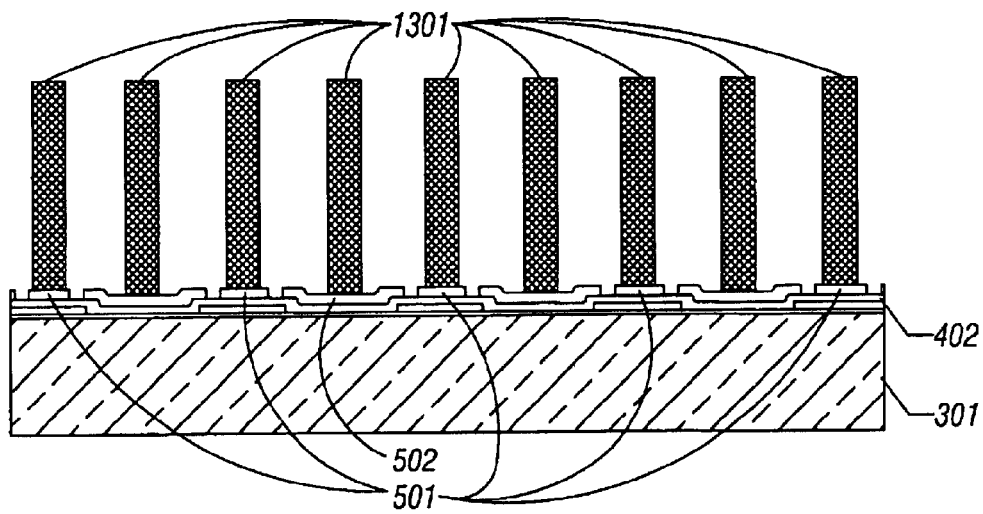
FIG. 20 depicts a cross-sectional view of the bonded substrate/spacer slice assembly of FIG. 18 or 19 following etching and removal of the matrix glass.

Referring back to FIGS. 8 and 9, the filler glass cladding 102 (filler strands 202 in the case of cubically-packed strands) and any unbonded permanent fiber core columns 101 (permanent glass columns 201 in the case of cubically-packed strands) are etched away in a 20 to 40° C. acid bath that is about 2% to 10% hydrogen chloride in deionized water. Depending on the amount of agitation and the thickness of the filler glass that must be etched away, the duration of the wet etch can vary from about 0.5 to 4 hours. Of the original spacer slice 901, only permanent spacer columns 1301 (see FIG. 20) remain.

Figure 21:
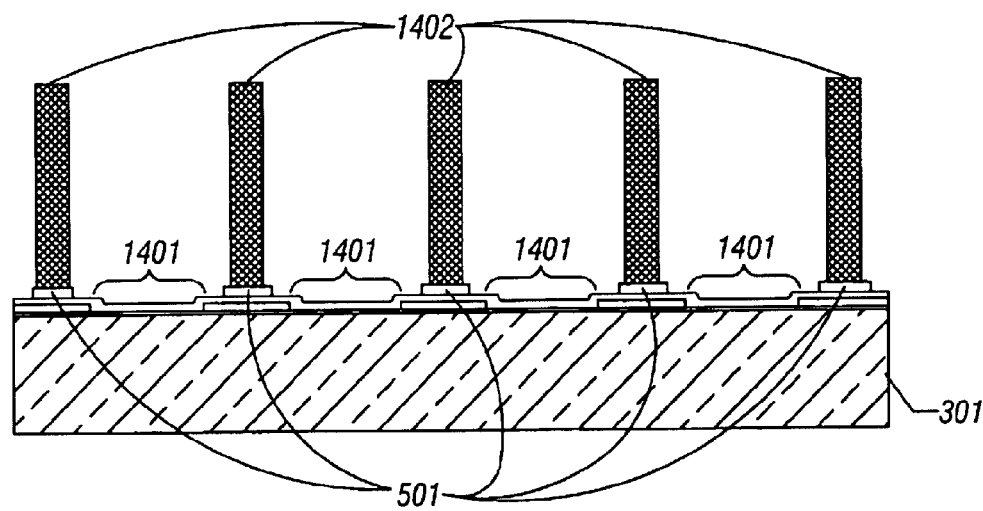
FIG. 21 is a cross-sectional view of the substrate/spacer assembly of FIG. 20 following an etching which removes the protective sacrificial layer and any permanent spacer columns which were bonded thereto.

Finally, as depicted by FIG. 21, the protective sacrificial layer 502, which covers the future phosphor areas 1401 of the face plate, is etched away. If, for example, the sacrificial layer is aluminum metal, then a wet aluminum etch is used. Any unwanted permanent spacer columns attached to the protective layer are, thus, removed, leaving only final, permanent glass spacer rods 1402.

Figure 22:
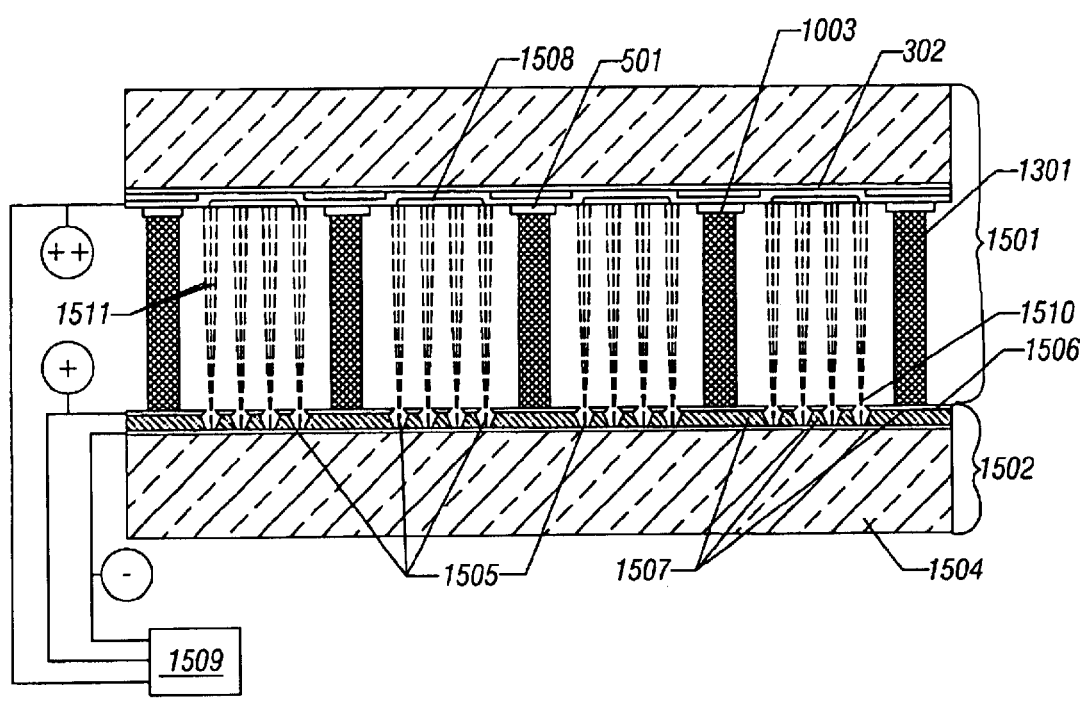
FIG. 22 is a cross-sectional view through a small portion of a field emission display.

Referring to FIG. 22, a cross-sectional view through a portion of a field emission flat panel display, which incorporates a face plate assembly having spacer columns which have been anodically bonded thereto by the above described process, is depicted. The display includes a face plate assembly 1501 and a representative base plate assembly 1502. For this particular display, the base plate assembly 1502 is formed by depositing a conductive layer 1503, such as silicon, on top of a glass substrate 1504.

The conductive layer 1503 is then etched to form individual conically-shaped micro cathodes 1505, each of which serves as a field emission site on the glass substrate 1504. Each micro cathode 1505 is located within a radially symmetrical aperture formed by etching, first, through a conductive gate layer 1506, and, then, through a lower insulating layer 1507. The face plate assembly 1501 incorporates a silicate glass substrate 301, an anti-reflective layer 302, a black matrix 401 formed from a transition metal oxide layer, a transparent conductive layer 402, an oxidizable material patch 501 at each spacer column attachment site, and a glass spacer column 1301 anodically bonded to the oxidizable material patch 501 at each such attachment site.

Each support column 1301 bears against an expanse of the gate layer 1506. In regions of the face plate not covered by the black matrix 401, phosphor dots 1508 have been deposited through one of many known deposition techniques (e.g., electrophoresis) or printing techniques (e.g., screen printing, ink jet, etc.) on the transparent conductive layer 402. When a voltage differential, generated by voltage source 1509, is applied between a micro cathode 1505 and its associated surrounding gate aperture 1510 in gate layer 1506, a stream of electrons 1511 is emitted toward the phosphor dots on the face plate assembly 1501 which are above the emitting micro cathode 1505.

The screen, which is charged via the transparent conductive layer 402 to a potential that is even higher than that applied to the gate layer 1506, functions as an anode by causing the emitted electrons to accelerate toward it. The micro cathodes 1505 are matrix addressable via circuitry within the base plate (not shown) and, thus, can be selectively activated in order to display a desired image on the phosphor-coated screen.

Other embodiments are within the scope of the following claims.

What is claimed is:

1. A system for bonding two materials together, comprising:
   a voltage source;
   electrodes in contact with the materials; and
   a controller configured to:
     connect the voltage source to the electrodes to transfer charge to the materials,
     measure the charge flowing to the materials, and
     disconnect the voltage source from the electrodes in response to the measurement indicating that a predetermined amount of the charge has been transferred to the materials.

2. The system of claim 1, wherein the materials comprise a glass material and an oxidizable material.

3. The system of claim 1, wherein the controller comprises:
   a switch; and
   a circuit configured to operate the switch to connect the energy source to and disconnect the energy source from the electrodes.

4. The system of claim 1, wherein the controller comprises:
   a transimpedance amplifier configured to indicate a rate of charge flow from the energy source to the electrodes; and
   an integrator connected to the transimpedance amplifier and configured to measure the amount of charge based on an integration of the rate over time.

5. A system for bonding a number of first materials to a second material at different regions of the second material, comprising:
   a voltage source;
   electrodes connected to the voltage source and configured to establish charge flowpaths; and
   controllers, each different controller associated with a different one of the flowpaths and configured to cause the charge to flow from the voltage source through the associated flowpath and halt the flow of charge in a response to a predetermined amount of the charge flowing through the associated flowpath.

6. The system of claim 5, wherein each controller comprises:
   a transimpedance amplifier configured to indicate a rate of charge flow through the associated flowpath; and
   an integrator connected to the transimpedance amplifier and configured to measure the amount of charge based on an integration of the rate over time.

7. The system of claim 6, wherein each controller further comprises:
   a comparator connected to the integrator and configured to indicate when the flow has reached the predetermined amount; and
   a switch configured to selectively halt the flow of charge through the flowpath based on the indication from the comparator.

8. The system of claim 5, wherein the second material comprises a face plate of a flat panel display and the first materials comprise glass spacer rods.

9. A system for bonding glass spacer rods to a face plate of a flat panel display, comprising:
   a voltage source;
   electrodes connected to the voltage source and configured to establish charge flowpaths, each different flowpath associated with a junction located between a different one of the glass spacer rods and the face plate; and
   controllers, each different controller associated with a different one of the flowpaths and configured to allow charge to flow from the voltage source through the associated flowpath and halt the flow of charge in response to a predetermined amount of the charge flowing to the junction associated with the flowpath.

10. The system of claim 9, wherein each controller further comprises:
    a transimpedance amplifier configured to indicate a rate of charge flow from the energy source to the electrodes; and
    an integrator connected to the transimpedance amplifier and configured to furnish an indication of how much charge has flowed through the flowpath based on an integration of the rate over time.

11. The system of claim 9, wherein each controller further comprises:
    a comparator connected to the integrator and configured to indicate when the flow has reached the predetermined amount; and
    a switch configured to selectively halt the flow of charge through the flowpath based on the indication from the comparator.

12. The system of claim 9, wherein the face plate comprises:
    a laminar glass substrate; and
    oxidizable materials located between the substrate and each spacer rod.

13. The system of claim 9, wherein the glass spacer rods comprise glass fibers.

* * * * *